United States Patent [19]

Kouyama et al.

[11] Patent Number: 4,644,400
[45] Date of Patent: Feb. 17, 1987

[54] DIGITAL AUDIO SYNCHRONIZING SYSTEM WITH CROSS-FADE MEANS

[75] Inventors: Toshitake Kouyama; Ryoji Katsube, both of Tokyo, Japan

[73] Assignee: NEC Corporation, Japan

[21] Appl. No.: 720,813

[22] Filed: Apr. 8, 1985

[30] Foreign Application Priority Data

Apr. 9, 1984 [JP] Japan ................................ 59-70599

[51] Int. Cl.$^4$ .............................................. H04N 5/04
[52] U.S. Cl. ..................................... 358/149; 360/36.2
[58] Field of Search ............... 358/143, 148, 149, 337, 358/339, 85, 19; 360/36.1, 36.2; 179/2 TV

[56] References Cited

U.S. PATENT DOCUMENTS

| | | | |
|---|---|---|---|
| 4,018,990 | 4/1977 | Long et al. ........................... | 358/149 |
| 4,109,276 | 8/1978 | Hopkins, Jr. et al. ............. | 360/36.2 |
| 4,218,705 | 8/1980 | Inaba et al. ......................... | 358/149 |
| 4,313,135 | 1/1982 | Cooper ................................ | 358/149 |

*Primary Examiner*—Jin F. Ng
*Attorney, Agent, or Firm*—Ostrolenk, Faber, Gerb & Soffen

[57] ABSTRACT

A digital audio synchronizing system resynchronizes the audio signal of a video signal by storing the audio signal in a memory and reading it out from the memory after a time period which is related to the time by which the video signal is delayed as a result of being synchronized to a reference video signal. In order to prevent a discontinuity in the audio signal waveform caused by variations in the time difference between the video signal and the reference signal, the digital audio signal is read out from memory addresses which correspond to the previous difference time and also to a new updated difference time value. The two outputs which are generated by reading the signal from two different areas of the memory are cross-faded with one another over a predetermined time period. The cross-fade operation can be repeated over several cycles, each taking a predetermined unit of time until the audio signal is synchronized to its video counterpart.

19 Claims, 6 Drawing Figures

DIGITAL AUDIO SYNCHRONIZING SYSTEM WITH CROSS-FADE MEANS

BACKGROUND OF THE INVENTION

(1) Field of the Invention

The present invention relates to a synchronizer, and in particular, to a digital audio synchronizer for compensating an audio signal for a time difference between the audio signal and an associated video signal whose timing is disturbed by being synchronized video signal to a reference video signal.

(2) Description of the Prior Art

In a multi-station TV broadcasting system, a video signal from a local station is frame-synchronized to a reference signal of the central station. The frame synchronization causes a time delay in the video signal, so that a time difference results between the synchronized video signal and an audio signal accompanying for this video signal. In order to compensate the time difference, a digital audio synchronizer or a digital audio-delay device is used.

In a known digital audio synchronizing system, the audio signal is digitized and then stored in a memory. The stored signal is then read out from the memory. Time-wise, the read-out address is offset from the write-in address by a number of address locations which produce a time difference equivalent to to the time difference between the reference signal and the synchronized video signal. Therefore, the output audio signal is delayed from the incoming audio signal by the same time difference as exists between the reference signal and the incoming video signal. Accordingly, the audio signal is synchronized to the video signal which in turn is synchronized to the reference signal.

In the known audio synchronizer, any variation or change of the time difference between the incoming video signal and the reference signal results in a jump in the read-out address. This produces a discontinuity in the output audio signal and an ensuing unacceptable click sound.

In order to resolve this problem, a method is known in the prior art wherein an audio data signal is repeatedly read-out from the same address in the memory or is read-out from a narrow range of addresses during the transition, the addresses being near the time-difference variations. But the discontinuity of the audio signal waveform is still unsatisfactorily resolved by this known method.

Another known method is to change the rate or frequency at which the audio signal is read from the memory. Although the discontinuity is not caused in the method, it takes, an undesirably, long time until the audio signal is delayed by the time-difference variation.

SUMMARY OF THE INVENTION

It is an object of the present invention to provide a digital audio synchronizing system wherein a desired delay of an audio signal can be performed in a short time without causing a discontinuity in the audio signal.

In a known digital audio synchronizing system, an audio signal is encoded into a digital audio signal, which is stored in a memory according to a write-in address data signal from a write-in address signal generating means. The stored digital audio signal is read out from the memory according to a first read-out address data signal from a first read-out address signal generating means. The first read-out address data signal is produced from the write-in address data signal and a delay-time data signal representing a required delay in the audio signal. The delay time is determined from the time-difference between a composite video signal accompanying the audio signal and a reference composite signal.

A digital audio synchronizing system according to the present invention provides delay-time determining means for determining the delay-time and a delay-time variation from a preceding delay time to a fresh delay time from the time difference between the composite video signal and the reference composite signal. The delay-time variation data signal is supplied to second read-out address signal generating means. The second read-out address signal generating means produces a second read-out address data signal from the first read-out address data signal and the delay-time variation signal. The digital audio signal is also read-out from the memory according to the second read-out address data signal. The digital audio signals read out according to the first and second read-out address data signals are cross faded in cross fading means. After completion of the cross-fading operation, the fresh delay time data is supplied to the first read-out address signal generating means.

Further objects, features and other aspects will be understood from the following detailed description of preferred embodiments of the present invention referring to the accompanying drawings.

DETAILED DESCRIPTION OF PREFERRED EMBODIMENTS

Prior to describing of embodiments of the present invention, a known audio synchronizing system is described below.

Figure 1:
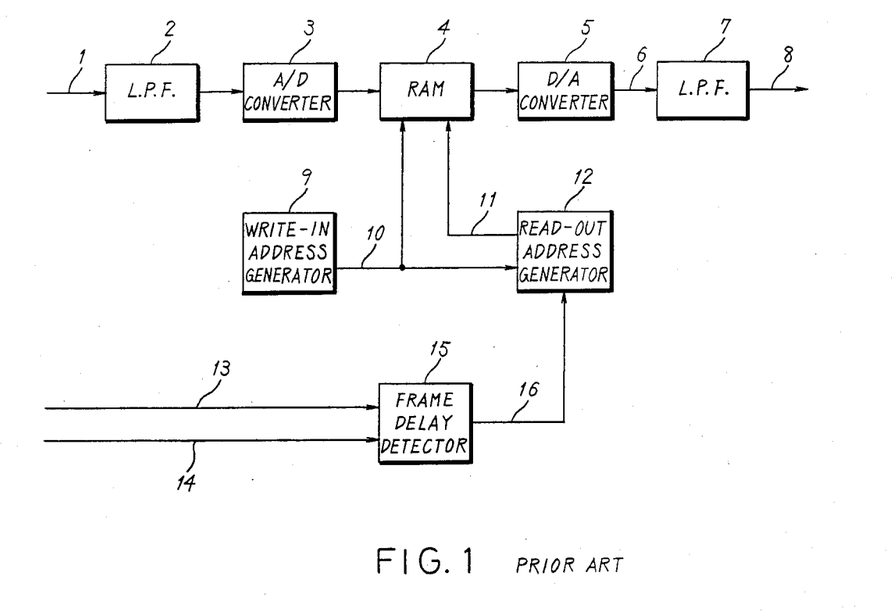
FIG. 1 is a schematic circuit diagram view of a known audio synchronizing system.

Referring to FIG. 1, an incoming audio signal 1 of the audio synchronizer shown therein is supplied through a low-pass filter (L.P.F.) 2 to an analog-digital (A/D) converter 3. The audio signal is sampled by sampling pulses having a frequency of, for example, 48 kHz and each sample is quantized into, for example, 16 bits. The 16-bit digital audio signal from A/D converter 3 is written into a random access memory (RAM) 4. The digital audio signal stored in RAM 4 is read out into a digital-analog (D/S) converter 5, from which a pulse-amplitude-modulated (PAM) audio signal 6 is obtained. The PAM audio signal is supplied to a low-pass filter 7, from which the regenerated audio signal 8 is obtained.

To store the 16-bit digital audio signal words into RAM 4, a write-in address generator 9 supplies a write-in address data signal 10 to RAM 4. The write-in address data signal 10 represents an address such as the address "0", the address "1", ..., in RAM 4, which is available at a rate of a frequency equal to the sampling frequency of 48 kHz.

The write-in address generator 9 consists of a counter counting clock pulses of 48 kHz from a clock pulse generator (not shown). The counter is of a type which self-clears after it reaches a predetermined maximum count value. Where RAM 4 is selected to store the audio data signal for a period of one frame (33 msec in the NTSC system) of the video signal, the counter will self-clear when it reaches the value 1584 (=48×33).

A read-out address data signal 11 is provided from a read-out address generator 12 to specify an address in RAM 4 from which the stored signal is read out. The read-out addresses are also generated at the rate of 48 kHz but with a time offset from the write-in address signal 10. The read-out address generator 12 consists of a subtractor for subtracting from the write-in address data signal 10 an offset data signal corresponding to a delay time of the audio signal, or a time difference between an incoming composite video signal accompanying the incoming audio signal 1 and the reference composite video signal.

The incoming composite video signal 13 and the reference composite video signal 14 are supplied to the frame delay detector 15, where a time difference between the reference composite signal 14 and the incoming composite video signal 13 is determined. The delay time of the audio signal is governed by this detected time difference. An offset data signal 16 corresponds to this delay time, and it is sent out from delay detector 15 to read-out address generator 12.

T represents the time delay between the incoming video signal 13 and the reference signal 14, WA and RA(T) represent the write-in address and the read-out address, respectively, and D(T) represents the offset data corresponding to the delay time T. Then the following equation (1) results:

$$RA(T) = WA - D(T) \quad (1)$$

Figure 3:
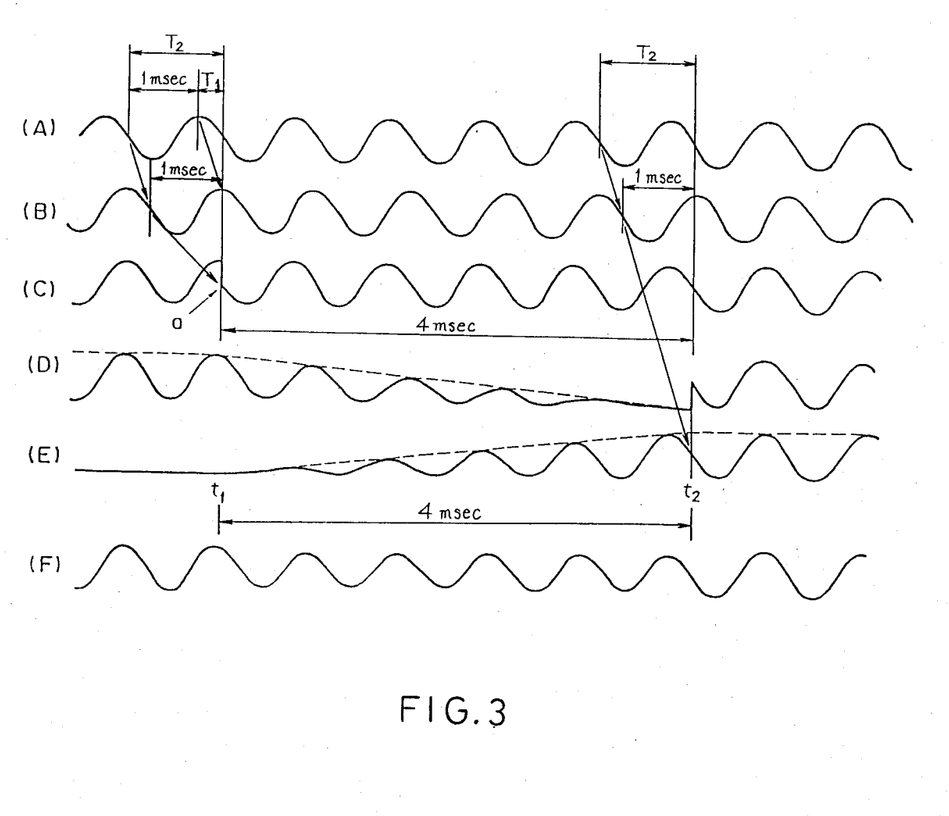
FIG. 3 illustrates various waveforms of an audio signal useful for explaining operation of the embodiment of FIG. 2.

If T is constant and has a value $T_1$ and that the incoming audio signal 1 is as shown at (A) in FIG. 3, the output audio signal 8 is delayed from the signal 1 by the time $T_1$ as shown at (B) in FIG. 3.

When T rapidly changes from $T_1$ to $T_2$ ($T_2 - T_1 = +1$ msec), the read-out address $RA(T_2)$ changes as given by:

$$\begin{aligned} RA(T_2) &= WA - D(T_2) \\ &= WA - [D(T_1) - \{D(T_1) - D(T_2)\}] \\ &= WA - [D(T_1) + D(T_2 - T_1)] \\ &= WA - D(T_1) - D(1). \end{aligned}$$

That is, the read-out address RA jumps from $[WA - D(T_1)]$ to $[WA - D(T_1) - D(1)]$. Therefore, a discontinuity (a) presents in the output audio signal 8 as shown at a waveform (C) in FIG. 3.

The present invention overcomes this problem of the discontinuity in the output audio signal caused by any change of the time difference between the incoming video signal and the reference signal.

Figure 2:
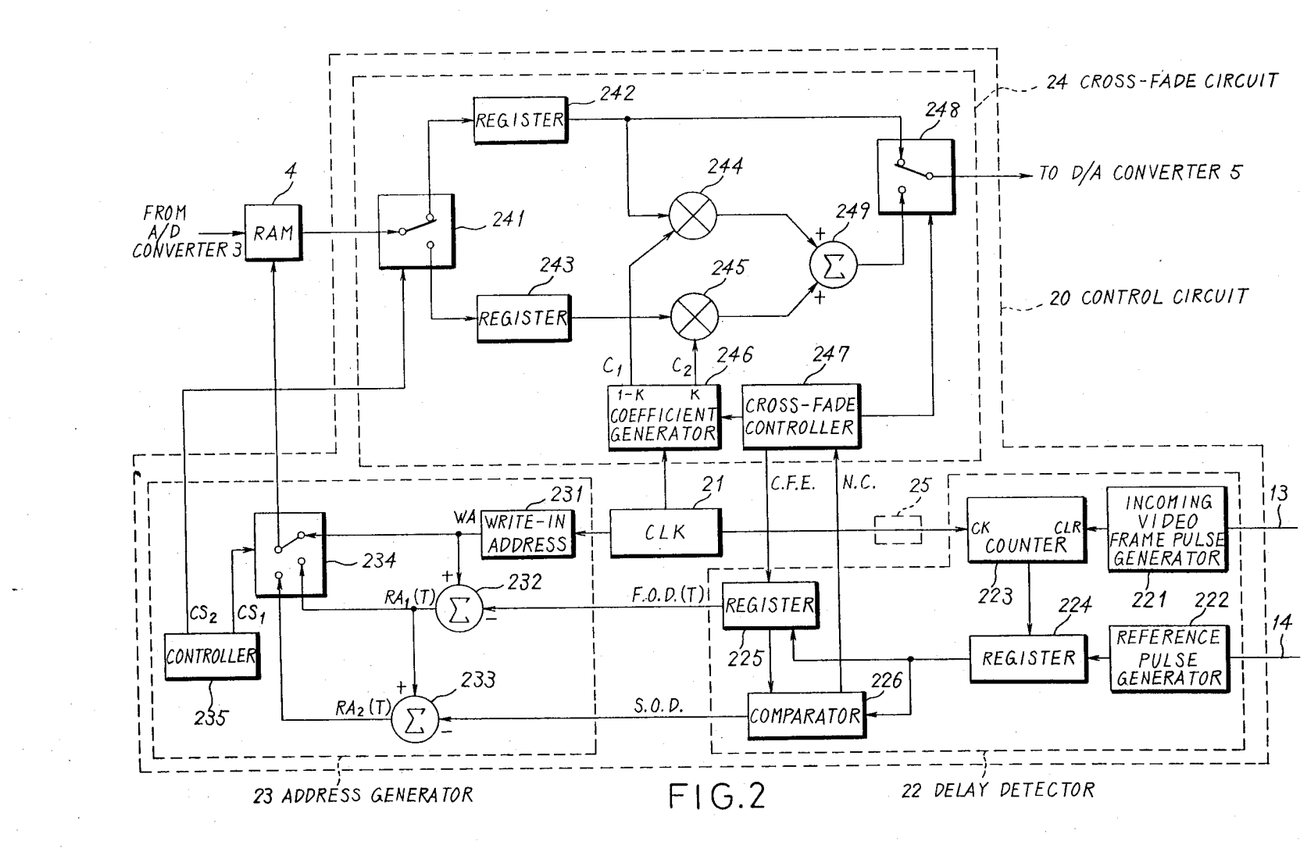
FIG. 2 is a block diagram of a main part of an embodiment according to the present invention.

Referring to FIG. 2, an embodiment of an audio synchronizing system according to the present invention is characterized by a novel write-in and read-out control circuit 20 for RAM 4. Although low-pass filter 2, A/D converter 3, D/A converter 5 and low-pass filter 7 are provided as in FIG. 1, they are not shown in FIG. 2 to simplify the drawing.

Control circuit 20 comprises a clock pulse generator 21, a delay detector 22, an address generator 23, and a cross-fade circuit 24.

Clock pulse generator 21 generates clock pulses at a frequency equal to the sampling frequency (48 kHz), as described previously.

Delay detector 22 detects the time delay between incoming composite video signal 13 and reference composite video signal 14 as does detector 15 in FIG. 1, but the delay detector 22 has the further functions to hold a previously detected delay time, and to detect a delay-time variation between the previous delay time and the last detected delay time.

Delay detector 22 shown herein comprises two pulse generators 221 and 222. Frame pulse generator 221 derives vertical synchronizing pulses from the incoming composite video signal 13 and produces frame pulses.

Since a frame consists of two fields which follow one another in the NTSC system, a frame pulse is produced once every two vertical synchronizing pulses associated with the fields. two.

Similarly, reference pulse generator 222 produces reference frame pulses from the reference composite video signal 14.

The frame pulses of frame pulse generator 221 are supplied to a counter 223 for clearing the contents of counter 223. Counter 223 counts clock pulses from reference clock generator 21. Another frame pulse from reference pulse generator 222 triggers register 224, to store the contents from counter 223. The stored data signal provides a delay time as detected.

Delay detector 22 further comprises another register 225 for holding a previously detected delay time, and the content of register 225 is replaced by the content of register 224 at a time when register 225 receives a cross-fading end signal (C.F.E.) as described hereinafter. The contents of register 225 is supplied to address generator 23 and provides a first offset data signal (F.O.D.(T)) to produce a first read-out address data signal.

The contents of both registers 224 and 225 are compared in a comparator 226. When the contents are unequal, a non-coincident signal (N.C.) is supplied to cross-fade circuit 24. At the same time, a delay-time variation signal, which represents a variation from the delay time in register 225 to the other fresh delay time in register 224, is supplied to address generator 23 and provides a second offset data signal (S.O.D.) to produce a second read-out address data signal.

When the content of register 224 is larger than the content of register 225, the second offset data (S.O.D.) is positive, but when it is smaller, the S.O.D. is negative.

Address generator 23 includes a write-in address generator 231, a first read-out address generator 232 and a second read-out address generator 233.

Write-in address generator 231 consists of a counter which receives clock pulses from clock pulse generator 21, and generates a write-in address data signal (WA) similar to write-in address generator 9 in FIG. 1.

First read-out address generator 232 is a subtractor which subtracts the first offset data (F.O.D.(T)) from the write-in address data (WA). Therefore, the first read-out address data signal $RA_1(T)$ is represented by the following equation (2):

$$RA_1(T) = WR - F.O.D.(T) \quad (2)$$

Second read-out address generator 233 is also a subtractor which subtracts the second offset data S.O.D. from the first read-out address data $RA_1(T)$. The second read-out address data $RA_2(T)$ is controlled by the following equation (3):

$$RA_2(T) = RA_1(T) - S.O.D. \quad (3)$$
$$= WA - F.O.D.(T) - S.O.D.$$

Address generator 23 further includes a first selector switch 234 and a switch controller 235. First selector switch 234 permits the selection of one of the write-in address data signal (WA), the first read-out address data signal ($RA_1(T)$) and the second read-out address data signal ($RA_2(T)$) to be supplied to RAM 4 in the indicated order, during one time period of the clock pulses. Controller 235 generates a first control signal ($CS_1$) for controlling selector switch 234. The first control signal ($CS_1$) produces three sequential pulses during each period of a clock pulse. The first pulse is for selecting the write-in address data signal (WA), the second pulse for the first read-out address data signal ($RA_1(T)$), and the third pulse is for the second read-out address data signal ($RA_2(T)$).

Cross-fade circuit 24 comprises a second selector switch 241 for connecting the read-out terminal from RAM 4 to two first and second registers 242 and 243, selectively. A second control signal ($CS_2$) for the second selector switch 241 is also supplied from switch controller 235. The second control signal ($CS_2$) comprises two sequential pulses during the period of the clock pulse. First pulse is synchronized with the second pulse of the first control signal ($CS_1$) and serve to select the first register 242. The second pulse is synchronized to the third pulse of the first control signal ($CS_1$) and serves for selecting the second register 243.

First and second multipliers 244 and 245 are provided on the output sides of first and second registers 242 and 243, respectively. The contents of registers 242 and 243 are multiplied by coefficients $C_1$ and $C_2$ at multipliers 244 and 245, respectively.

The coefficients $C_1$ and $C_2$ are generated by a coefficient generator 246. The first coefficient $C_1$ is $(1-K)$ and the second coefficient $C_2$ is K, where K increases in synchronization with the clock pulses from 0 to 1 during a cross-fade period determined by a cross-fade controller 247.

Where the cross-fade period is 4 msec, K increases in increments of during each $1/(48 \times 4)$ clock pulse, because the clock frequency is 48 kHz, and the cross-fade period is 4 msec.

Cross-fade controller 247 generally consists of a timer, which is driven by the non-coincidence (N.C.) signal from comparator 226. The controller 247 provides a high level ("H") signal to coefficient generator 246 and a third selector switch 248 during the predetermined cross-fade period (for example, 4 msec). After lapse of the cross-fade period, the output signal of "H" from cross-fade controller 247 changes to a low level ("L") signal. At that time, cross-fade controller 247 also provides the cross-fade end signal (C.F.E.) to register 225.

Outputs of both multipliers 244 and 245 are added to each other by adder 249.

Selector switch 248 selects as an output either the output of adder 249 or that of first register 242 and supplies the selected output to D/A converter 5. When cross-fade controller 247 generates "H" signal, the output data signal from adder 249 is selected by selector switch 248. While, in response to "L" signal, selector switch 248 selects the output data signal from first register 242.

The operation of the circuit of FIG. 2 will now be described.

When the time difference between the incoming composite video signal 13 and the reference composite signal remains constant at a value of $T_1$, offset data signal F.O.D.(T) from register 225 represents correctly this time difference of value $T_1$. The non-coincidence signal (N.C.) is not supplied to cross-fade controller 247, so that the content of first register 242 is selected by selector switch 248 and is transferred to D/A converter 5. Therefore, the data in RAM 4 are read out from addresses indicated by the first read-out address data signal $RA_1(T_1)$ ($=WA-F.O.D.(T_1)$) and transferred to D/A converter 5. The output signal from adder 249 under this condition is not supplied to D/A converter 5.

When the incoming audio signal is as shown at (A) in FIG. 3, the output audio signal from the low-pass filter (7 in FIG. 1) is as shown at (B) in FIG. 3, similarly to the known audio synchronizer in FIG. 1.

When a new different delay time $T_2$ is just detected and stored in register 224, that delay time is compared to the previously detected delay time $T_2$ in register 225. Consequently a delay-time variation of $(T_2-T_1)$, for example, 1 msec will be detected by comparator 226. Then, the non-coincident signal N.C. is applied to cross-fade controller 247, so that "H" level signal is applied to selector switch 248 and coefficient generator 246 during the cross-fade period of 4 msec. Therefore, the output of adder 249 is connected to D/A converter 5 and the first register 242 is disconnected from D/A converter 5 by selector switch 248.

On the other hand, comparator 226 provides the second offset data signal S.O.D. corresponding to the delay time variation, or the increase in the time difference of 1 msec, to second read-out address generator 233, which, in turn, outputs the second read-out address data signal $RA_2(T_2)$ ($=RA_1(T_1)-S.O.D.$).

The digital audio signal stored in RAM 4 is read out from addresses alternatively supplied from the first and second read-out address data signals $RA_1(T_1)$ and $RA_2(T_2)$. The data from the RAM 4 are stored in first and second registers 242 and 243, respectively, under control of selector switch 241. The contents of first and second registers 242 and 243 are multiplied by coefficients $(1-K)$ and K using first and second multipliers 244 and 245, respectively. This takes place because coefficient generator 246 is driven by the "H" signal from cross-fade controller 247 which in turn supplys the coefficient signals $C_1$ and $C_2$ to multipliers 244 and 245, respectively.

Accordingly, the audio signal on the output of first multiplier 244, if it is converted into an analog signal, has an amplitude which gradually decreases to zero during the cross-fade period of 4 msec, as shown by (D) in FIG. 3. On the other hand, the audio signal from the output of second multiplier 245 has an amplitude which gradually increases from zero, as shown by (E) in FIG. 4. Those signals are added to each other at adder 249 in a cross-fading manner. The resultant signal is supplied to D/A converter 5 which produces the analog signal.

After the end of the cross-fade period of 4 msec, cross-fade end signal C.F.E. is supplied from cross-fade controller 247 to register 225. At this time, the control signal which is supplied to selector switch 248 and coefficient generator 246 from cross-fade controller 247 assumes a low level "L" again. Accordingly, the content of register 225 is replaced by the content of register 224, so that the first offset data signal F.O.D. ($T_1$) is changed to one a value (F.O.D.($T_2$)) which corresponds to the newest delay time of $T_2$. Since selector switch 248 is switched to first register 242 by the "L" signal supplied thereto from cross-fade controller 247, only the data signal read out from addresses indicated by the first read-out address data signal $RA_1(T_2)$ ($=WR-F.O.D.(T_2)$) is sent out to D/A converter after completion of the fading period of 4 msec.

The output audio signal from the low-pass filter (7 in FIG. 1) is as shown at (F) in FIG. 3. That is, when the time difference of the incoming composite video signal 13 and the reference signal 14 is detected to increase from $T_1$ to $T_2$ ($T_2-T_1=1$ msec) at a time $t_1$, the digital audio signal in RAM 4 is read out from addresses identified by the first and second read-out address data signals $RA_1(T_1)$ and $RA_2(T_2)$, and the read-out signals are cross-faded during the cross-fade period of 4 msec. Therefore, the output audio signal is not abruptly changed as is true for waveform (C) in FIG. 3 by the sudden change in the delay time. Rather, a smooth changeover as shown at (F) in FIG. 3 takes place in order to to synchronize the audio signal to the video signal. Thus, the annoying click does not occur.

In the above-described embodiment, the cross-fade operation occurs frequently because comparator 225 provides the non-coincidence signal (N.C.) in response to timing difference changes as small as 20.8 μsec (1/48 kHz) of in relation to the time difference between the incoming composite signal 13 and the reference signal 14. The incidence of cross-fade operation can be readily reduced by simple modification to the above-described embodiment.

In one modification, the register 224 is connected only to the upper or more significant bits of counter 223. For example, only upper bits than representing values higher desired number 16 may be stored in register 224. In this arrangement, the cross-fade operation is not carried out if the time difference between the video signals 13 and 14 does not change more than 332.8 μsec ($=20.8\times16$). In this case, the first and second read-out address generators 232 and 233 should be provided with offset data generators similar to elements 236 and 237 in FIG. 5 which are described below.

Another modification provides a frequency divider (which is shown by a block dotted 25 in FIG. 2) through which clock pulse generator 21 is connected to counter 223. For example, the 48 RHz clock pulses are divided by 1/48 at the divider 25. Then, the cross-fade operation is carried out in response to the time difference change of 1 msec ($=1/1$KHz) or more. In this case, the same offset data generators should be also provided to the first and second read-out address generators.

More cross-fade operation can be eliminated by preventing the cross-fade operation from taking place until the number of occurrences exceeds a predetermined value.

Figure 4:
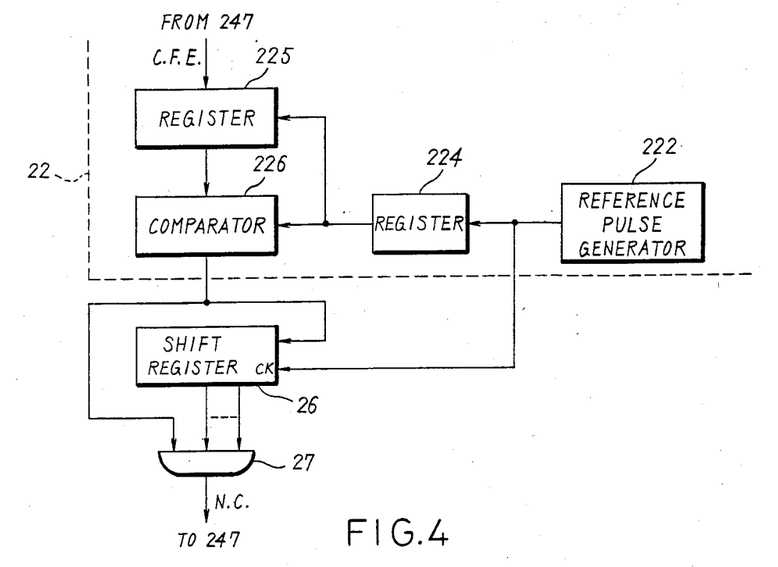
FIG. 4 is a block diagram of a main part of another embodiment according to the present invention.

Referring to FIG. 4, a shift register, for example, 16-bit shift register 26 is added to delay detector 22. The non-coincidence signal from comparator 226 is the shift register by frame pulses applied to its CK (clock) terminal from reference frame pulse generator 222. All the output bits of the shift register 26 are applied to inputs of an AND gate 27. The non-coincidence signal (N.C.) is applied to the other input of AND gate 27. Therefore, when the all bits of shift register 26 are "1", the non-coincidence signal (N.C.) is supplied to cross-fade controller 27 through the AND gate 27. The shift register 26 in effect is a hysteresis circuit for the delay-time variation.

Figure 5:
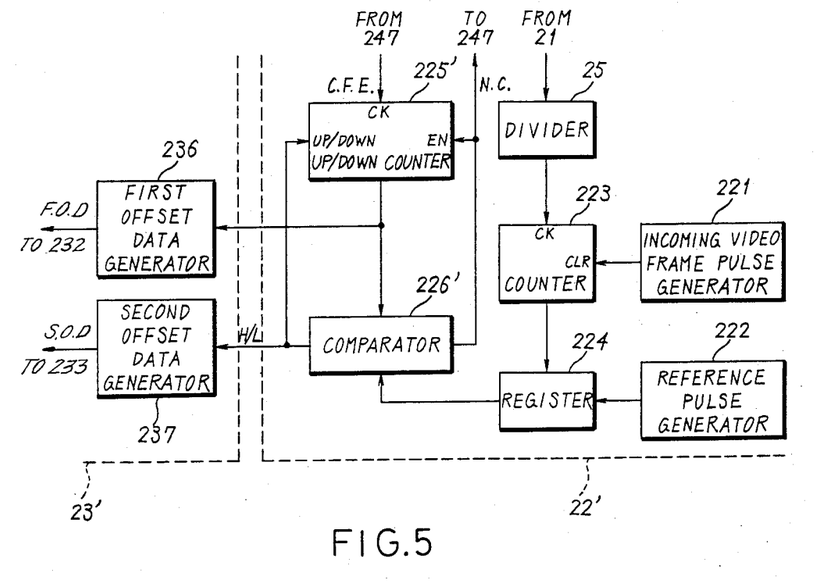
FIG. 5 is a block diagram of a main part of a further embodiment according to the present invention.

Referring to FIG. 5, the embodiment shown therein is different from the embodiment of FIG. 2 in view of delay detector 22' and address generator 23'. The differences are highlighted in the figure and are described below. Portions which are identical to the previously described embodiment are represented by the same reference numerals as in FIG. 2.

An up-down counter 225' is used in place of register 225 of FIG. 2. The up-down counter 225' counts up or down in response to a clock input which here is the cross-fade end signal (C.F.E.) from cross-fade controller 247. The counter 225' counts (up or down) only during a time period when the counter is enabled by the non-coincidence signal (N.C.) from comparator 226'. Whether the counter 225' counts up or down is determined by the level of the H/L signal from comparator 226'.

Comparator 226' compares the counted value of counter 225' with the content of register 224, and outputs an "H" on the H/L signal when the value of the counter is smaller than the value of the comparator and "L" signal in the opposite situation. The non-coincidence signal (N.C.) is outputted from comparator 226' when the counted value and the comparator value are unequal.

The H/L signal is supplied both to up-down counter 225' and also to second offset data generator 237 located in address generator 23'. The second offset data generator 237 holds predetermined positive and negative numerical values, for example, "+48" and "−48" which correspond to a 1 msec time difference increase or decrease, respectively. The positive or negative number is selected dependent on the "H" or "L" signal from comparator 226'. Selected value is supplied to second read-out address generator 233 as the second offset data signal (S.O.D.).

In this embodiment, clock pulses from clock pulse generator 21 are supplied to counter 223 after being divided by 1/48 by frequency divider 25. Therefore, a time-difference of 1 msec or more can be detected. Address generator 23' also includes a first offset data generator 236 which multiplies the value $V(t_1)$ from up-down counter 225' by 48 to a and then outputs the result as first offset data F.O.D. ($V(t_1)$ is the count output of the counter during a time instant $t_1$; $V(t_2)$ is the value at time $t_2$, etc. This will be described in greater detail.

In operation, when the time difference between the incoming composite video signal 13 and the reference signal 14 increases by 4 msec, comparator 226' outputs the non-coincidence signal (N.C.) and the H/L signal goes higher. Then, cross-fade controller 247 is actuated, while the second offset data (S.O.D.) outputs the valve "+48" to second read-out address generator 233. Therefore, the stored data signal in RAM 4 is read out from addresses determined by the first read-out address data signal $RA_1(T_1)$ ($=WA-V(T_1)\times48$) and the second read-out address data signal $RA_2(T_2)$ (=RA₁(T₁)−48). The read-out data signals are cross-faded at cross-fade circuit 24 over a 4 msec period, as previously described.

When the cross-fade period of 4 msec elapses, counter 225' counts up the cross-fade end signal (C.F.E.) and the counted value increases by 1. That is, $V(t_2)=V(t_1)+1$. Therefore, the first offset data signal (F.O.D.) increases by a number of "48" corresponding to 1 msec, so that the first read-out address data $RA_1(T_1)$ is increased by "48" and has a new value $(WA-V(t_2)\times 48)$.

Comparator 226' maintains the "H" signal and the non-coincidence signal (N.C.). Therefore, the similar cross-fade operation is carried out again for another period of 4 msec.

Thereafter, the same operation is repeated until the counted value in counter 225' and the content of register 224 are equal to one another.

Figure 6:
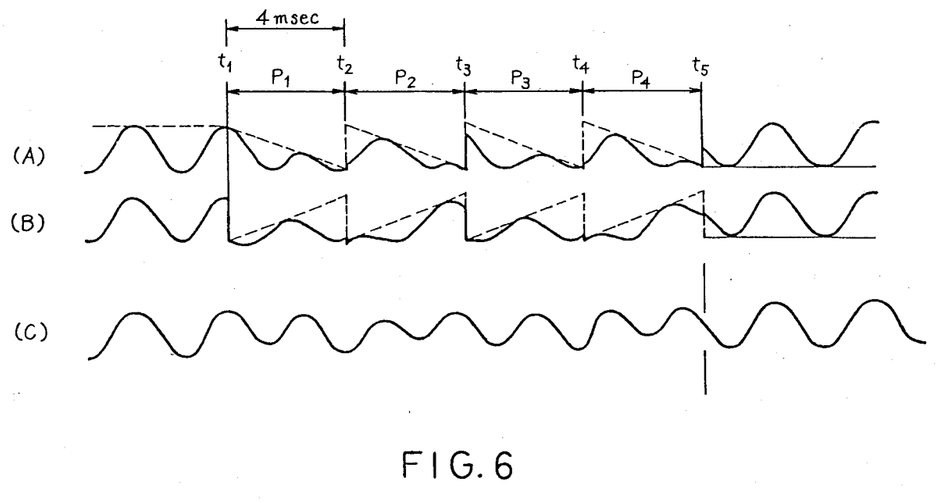
FIG. 6 illustrates various waveforms of an audio signal useful for explaining the operation of the embodiment of FIG. 5.

In the given example the detect time variation was an increase of 4 msec. Hence four cross-fade operation are carried out, each providing a 1 msec adjustment. Referring to FIG. 6, the output signals of multipliers 244 and 245, as they appear after being converted into analog signals, are shown at (A) and. In the figure, $P_1-P_4$ represent respective cross-fade periods. Since the output signals are added to each other at adder 249, the output audio signal of the synchronizer has a waveform as shown at (C) in FIG. 6, and does not have a waveform discontinuity.

In the above described embodiments, parallel digital signals and processing circuits were used. But, it will be readily recognized by those skilled in the art that the embodiments can be modified to use serial circuits. For example, where the sampling frequency is 48 kHz and the digital signal has 16 bits, as described hereinbefore, a clock source can be provided which generates clock pulses at a frequency of 3072 kHz ($=48\times 4\times 16$) i.e. 3.072 mHz. A divider is used in place of clock generator 21 which divides the 3072 kHz clock to yield a 48 kHz clock. On the other hand, the 3072 kHz clock pulses are supplied to RAM 4 in synchronization with the write-in address data signal WA and first and second read-out address data signals $RA_1$ and $RA_2$, so that the serial stream of 16-bits can be written into, and read out from, RAM 4. Registers 242 and 243 should be serial-parallel converters. A parallel-serial converter should be used between the selection switch 248 and the D/A converter 5, if the D/A converter is a serial device.

What is claimed is:

1. A circuit for synchronizing an audio signal to a reference video signal, said audio signal being associated with an input composite video signal, wherein a time difference between said audio signal and said reference video signal changes from time to time to unsynchronize said audio signal and said reference video signal, said circuit comprising:
   means for measuring repetitively a video time difference between said reference video signal and said composite video signal associated with said audio signal, said measuring means producing a control signal whenever a change is detected between a previous value of said video time difference and a present value of said video time difference which change unsynchronizes said audio signal from said reference video signal;
   means for variably delaying said audio signal to produce a delayed audio signal, said delaying means including means for storing said audio signal in a memory and retrieving said audio signal from said memory after the lapse of a delay period following the storing thereof; and
   cross-fading means, responsive to said video time difference and said control signal from said measuring means, for
   (1) causing said delaying means to delay said audio signal by a first time delay period corresponding to said previous video time difference and a second time delay period corresponding to said present video time difference, thereby generating first and second delayed audio signals, respectively, and
   (2) cross-fading said two delayed audio signals over a predetermined fading time period, such that after said predetermined fading time period said audio signal is resynchronized to said reference video signal.

2. A circuit as in claim 1 in which said cross-fading means includes
   means for reading out, during said predetermined fading time period, a first portion of said audio signal which corresponds to said first time delay period, means for reading out a second portion of said audio signal which corresponds to said second time delay period, thereby generating said first and second delayed audio signals, respectively; and
   means for multiplying said first and second audio signal portions by first and second coefficients, respectively, the value of said first coefficient decreasing and the value of said second coefficient increasing over said fading time period such that said first audio portion predominates toward the beginning of said fading time period and said second portion predominates toward the end of said predetermined fading time period, said audio signal thereby changing smoothly in response to the detection of said variation in said video time difference.

3. A circuit as in claim 2 in which said means for reading out said first and second audio signal portions comprises:
   a first register and a second register for holding respectively values of said first and second audio signal portions; and said multiplying means comprises:
   first and second multipliers, responsive respectively to said first and second coefficients and further responsive to said first and second registers, for multiplying values retrieved from said first and second registers by said first and second coefficients respectively to produce, respectively, a first multiplier output and a second multiplier output;
   an adder for adding said first and second multiplier outputs to produce an adder output; and
   means for generating said first and second coefficients.

4. A circuit as in claim 3, further comprising selector means for selecting said adder output during said fading time period and for selecting an output from said first register during times other than said fading time periods; and means for transmitting the output selected by said selecting means to a digital to analog converter.

5. A circuit as in claim 4 in which said fading time period ranges between 1 to 4 milliseconds.

6. A circuit as in claim 5, further including means for sampling and digitizing said audio signal at a rate of about 48 kHz.

7. A circuit as in claim 2 in which said means for reading out said first and second audio signal portions comprises:
  a first register and a second register for holding respectively values of said first and second audio signal portions; and said multiplying means comprises:
  first and second multipliers, responsive respectively to said first and second coefficients and further responsive to said first and second registers, for multiplying values retrieved from said first and second registers by said first and second coefficients respectively to produce a first multiplier output and a second multiplier output;
  an adder for adding said first and second multiplier outputs to produce an adder output; and
  means for generating said first and second coefficients; and said delaying means comprises:
  writing addressing means for generating writing addresses which determine the locations in said memory where said audio signal is to be stored;
  first reading addressing means for producing first read-out addresses which are offset from said writing addresses for reading out said audio signal after said first time delay period which corresponds to said previous video time difference;
  second reading addressing means for generating second read-out addresses which are offset from said first readout addresses by a value which is related to a variation between said previous video time difference and said present video time difference; and
  means for applying said writing addresses and said first and second read-out addresses to said memory.

8. A circuit as in claim 2 in which
  (a) said means for reading out said first and second audio signal portions comprises:
    a first register and a second register for holding respectively values of said first and second audio signal portions;
  (b) said multiplying means comprises:
    first and second multipliers, responsive respectively to said first and second coefficients and further responsive to said first and second registers, for multiplying values retrieved from said first and second registers by said first and second coefficients respectively to produce, respectively, a first multiplier output and a second multiplier output;
    an adder for adding said first and second multiplier outputs to produce an adder output; and
    means for generating said first and second coefficients; and
  (c) said measuring means comprises:
    an incoming video frame pulse generator for generating a pulse at the beginning of each frame associated with said input composite video signal;
    a reference frame pulse generator for generating a pulse at the beginning of each frame associated with said reference video signal; and
    counting means for counting the time between said pulse generated by said incoming video frame pulse generator and said pulse generated by said reference frame pulse generator.

9. A circuit as in claim 1 in which said measuring means includes
  means for measuring the variation between successive values of said video time difference, and in which said delaying means includes:
  writing addressing means for generating writing addresses which determine the locations in said memory where said audio signal is to be stored;
  first reading addressing means for producing first read-out addresses which are offset from said writing addresses for reading out said audio signal after said first time delay period which corresponds to said previous video time difference;
  second reading addressing means for generating second read-out addresses which are offset from said first readout addresses by a value which is related to a variation between said previous video time difference and said present video time difference; and
  means for applying said writing addresses and said first and second read-out addresses to said memory.

10. A circuit as in claim 9 in which said measuring means includes
  a register for holding said video time difference and an adder responsive to said writing addressing means and to said last-mentioned register for producing said first readout addresses;
  a comparator for comparing a previous video time difference with subsequent video time differences to detect said change in said video time difference; and
  an adder, responsive to said first reading addressing means and to said comparator, for producing said second read-out addresses.

11. A circuit as in claim 1 in which said measuring means comprises
  an incoming video frame pulse generator for generating a pulse at the beginning of each frame associated with said input composite video signal;
  a reference frame pulse generator for generating a pulse at the beginning of each frame associated with said reference video signal;
  counting means for counting the time between said pulse generated by said incoming video frame pulse generator and said pulse generated by said reference frame pulse generator.

12. A circuit as in claim 11, said counting means comprising a clock; a counter for counting pulses generated by said clock between successive pulses from said incoming video frame pulse generator; and a register responsive to said reference frame pulse generator and coupled to said counter for holding a count value from said counter representative of said video time difference.

13. A circuit as in claim 12, further including means for adjusting the frequency with which said time difference between said audio signal and said reference video signal is measured.

14. A circuit as in claim 13 in which said means for adjusting the frequency comprises a divider circuit for dividing the frequency of said clock to produce a low frequency clock.

15. A circuit as in claim 14 in which only a predetermined number of more significant data bits from said counter for counting pulses generated by said clock are employed for providing values of said time difference.

16. A circuit as in claim 14, further comprising means for carrying out said cross-fading operation over a plurality of predetermined time periods.

17. A circuit as in claim 14 in which said measuring means further comprises a comparator responsive to said counting means which produces said time difference;
- an up and down counter coupled to said comparator and to said cross-fading means, said comparator being adapted to compare values received from said up and down counter to a time difference received from said counting means and to produce a count up/down signal which directs said up and down counter to count up or down;
- a first offset data generator for multiplying a count value from said up and down counter by a predetermined number and for presenting a first offset data value which corresponds to said first read out addresses; and
- a second offset data generator which presents a positive or negative predetermined value in response to the level of said count up/down signal from said comparator, said second offset data value comprising said second readout addresses.

18. A circuit as in claim 1 in which said cross-fading means is actuated in response to a non-coincidence signal, and said measuring means further comprises means for counting the occurrence of said control signal for generating said non-coincidence signal after the occurrence of a predetermined number of said control signals.

19. A circuit as in claim 18 in which said means for counting the occurrence of said control signal comprises a shift register.

* * * * *